United States Patent
Zlotnick et al.

(10) Patent No.: US 6,658,166 B1
(45) Date of Patent: Dec. 2, 2003

(54) CORRECTION OF DISTORTIONS IN FORM PROCESSING

(75) Inventors: Aviad Zlotnick, Mizpe Netofa (IL); Ronen Shevach, Netanya (IL); Sergey Krutyolkin, Nazareth Ilit (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/521,399

(22) Filed: Mar. 8, 2000

(51) Int. Cl.[7] .................................................. G06K 9/20
(52) U.S. Cl. ...................... 382/282; 382/276; 358/452
(58) Field of Search ................................. 382/276, 277, 382/280–283, 293, 295, 296, 173, 198, 209; 358/452–453; 707/500

(56) References Cited

U.S. PATENT DOCUMENTS

| | | | |
|---|---|---|---|
| 4,832,477 A | 5/1989 | Torii et al. | 359/877 |
| 5,067,162 A | 11/1991 | Driscoll et al. | 382/126 |
| 5,182,656 A | 1/1993 | Chevion et al. | 358/452 |
| 5,191,525 A | 3/1993 | LeBrun et al. | 707/500 |
| 5,715,325 A | 2/1998 | Bang et al. | 382/118 |
| 5,793,887 A | 8/1998 | Zlotnick et al. | 382/209 |

Primary Examiner—Leo Boudreau
Assistant Examiner—Duy M. Dang
(74) Attorney, Agent, or Firm—Darby & Darby

(57) ABSTRACT

A method for processing an input image includes applying one or more transformations to the input image, whereby different shifts are applied to different pixels in the input image, so as to generate an output image. A region containing content of interest is selected in the output image, and the region corresponding to the selected region in the output image is located in the input image. The content of the located region in the input image is substituted for the content of the selected region in the output image.

26 Claims, 3 Drawing Sheets

CORRECTION OF DISTORTIONS IN FORM PROCESSING

FIELD OF THE INVENTION

The present invention relates generally to document image processing, and specifically to correction of distortions in document images.

BACKGROUND OF THE INVENTION

In many document imaging systems, large numbers of forms are scanned into a computer, which then processes the resultant document images to extract pertinent information. Typically the forms comprise preprinted templates, containing predefined fields that have been filled in by hand or with machine-printed characters. To extract the information that has been filled in, the computer must first identify the fields of the template and then decipher the characters appearing in the fields. Various methods of image analysis and optical character recognition (OCR) are known in the art for these purposes.

In order to identify the fields of the template and assign the characters to the correct fields, a common technique is for the computer to register each document image with a reference image of the template. Once the template is registered, it can be dropped from the document image, leaving only the handwritten characters in their appropriate locations on the page. Such registration may be difficult, however, because of distortions introduced in scanning the original form, including skew, rotation, warp and other scale changes.

One method for dealing with these distortions is described in U.S. Pat. No. 5,182,656, whose disclosure is incorporated herein by reference. The original image is partitioned into a number of relatively small overlapping segments. Each of the segments is then shifted in order to bring it into alignment with an appropriate, corresponding segment of the reference template image. More complex transformations, such as rotations or scale changes, are not performed on these segments. The transformation of the entire image is thus represented as a combination of the shifts of the small segments, which can approximate rotations and scale changes if the segments are made small enough.

FIG. 1 is a schematic illustration showing a detail of an image of a filled-in form document 20, useful in understanding the method of U.S. Pat. No. 5,182,656 and of similar methods known in the art. Here a name, comprising characters 24, has been filled into a box 22 provided by a template on document 20. The box is slightly rotated relative to its proper, horizontal position on the reference template. In order to correct this rotation and for other distortions in the scanned image, the image of the document is divided into segments 26, 28, 30, 32, etc. The image is analyzed to determine the appropriate shift transformation to be applied to each of the segments, as specified in the patent.

FIG. 2 is a schematic illustration of segments 26. 28, 30 and 32 in their respective, transformed positions. To compensate for the rotation, a different shift is applied to each of the segments. The relative shifts are exaggerated in the figure for clarity of illustration. Furthermore, an overlap has been introduced between the transformed segments, such as may result from a scale distortion in the scanned image, for example. In these areas, the above-mentioned patent suggests performing an OR operation for each pixel in order to avoid having one segment overwrite another.

FIG. 3 schematically illustrates the results of the shifts shown in FIG. 2. Characters 24 are broken into respective upper portions 34 and lower portions 36, because the characters happened to cross the boundaries between segments 26 and 30 and between segments 28 and 32. In consequence, even though box 22 may in the end be successfully registered with the corresponding box in the reference template image, the characters in the box are difficult or impossible for the computer to decipher. This document will probably have to be passed to a human operator for data entry, adding substantially to the cost of processing the document. What is worse, the computer may misinterpret the distorted characters, leading to an error in the data extracted from the form.

U.S. Pat. No. 5,793,887, whose disclosure is incorporated herein by reference, describes another method for alignment of images for template elimination. In this case, a filled-in document image and a reference template image are divided into vertical bands. The bands are shifted relative to one another in order to correlate the lines in the document image with the lines in the corresponding bands of the reference template image. If necessary, the procedure is then repeated using horizontal bands. Thus, this method can also lead to break-up of characters, as illustrated in FIG. 3.

SUMMARY OF THE INVENTION

It is an object of the present invention to provide improved methods and apparatus for processing images, and particularly for processing images of filled-in form documents.

It is a further object of some aspects of the present invention to provide methods and apparatus for document image processing that improve the readability of characters in such images in the presence of image distortion and rotation. It is a particular object of these aspects of the present invention to alleviate problems of readability that may arise due to misalignment between segments of such images that are shifted for the purpose of template registration.

In preferred embodiments of the present invention, an input document image, containing characters filled into a form template, is processed in order to register the template in the image with a reference template image. Any suitable method known in the art may be used for this purpose. Regions of interest, defined as regions containing filled-in characters, are identified in the processed image. Each of these regions is preferably checked in order to determine whether the readability of the characters in the region has been adversely affected by transformations applied in processing the image to register it with the reference template. Typically, although not exclusively, such adverse effects result when different parts of the region fall into different segments of the image to which different transformations are applied. The contents of each of the affected regions (or of all of the regions) are then erased from the processed image and are replaced by the contents of the corresponding region of the input image. In this manner, all of the characters in the input image are placed in the correct locations relative to the reference template, substantially without adverse effect on the readability of the characters.

Although preferred embodiments are described herein with reference to document form images, it will be appreciated that the principles of the present invention may likewise be applied in other contexts, as well. It frequently occurs in image processing that a digital transformation applied to an image is not exact, in the sense that the resulting offset between two neighboring pixels is different from the theoretical offset. This inexactness may be due to local segment transformations, as described above, or to other errors, such as rounding or decimation. If there are areas of particular interest in the image, such as a text block or other significant image features, the method of the present invention may be used advantageously to enhance the readability and/or clarity of details in these areas.

There is therefore provided, in accordance with a preferred embodiment of the present invention, a method for processing an input image, including:

applying one or more transformations to the input image, whereby different shifts are applied to different pixels in the input image, so as to generate an output image;

selecting in the output image a region containing content of interest;

locating in the input image the region corresponding to the selected region in the output image; and substituting the content of the located region in the input image for the content of the selected region in the output image.

Preferably, applying the one or more transformations includes dividing the input image into segments, and determining a transformation to be applied to each segment. In a preferred embodiment, the input image includes a template delineating the region, which is filled in with the content of interest, and determining the transformation to be applied to each segment includes finding one or more translations of the segment that approximately compensate for a distortion of the input image relative to a reference template, whereby the output image is registered with the reference template. Typically, the one or more translations compensate for a rotation of the input image relative to the reference template. Further typically, applying the one or more transformations includes applying different transformations to two or more mutually-adjoining segments, and selecting the region includes selecting a region that was divided between the two or more segments to which different transformations were applied.

Preferably, the input image includes a template delineating the region, which is filled in with the content of interest, and selecting the region includes identifying a field of the template that is intended to receive the content of interest. Alternatively or additionally, selecting the region includes removing the template from the output image and selecting a portion of the image remaining after the template is removed.

Further preferably, selecting the region includes selecting a region responsive to the one or more transformations applied to the input image. In a preferred embodiment, the content of interest includes alphanumeric characters, and selecting the region includes selecting a region in which it is likely that the one or more transformations have adversely affected the readability of the characters in the region.

Preferably, locating the region includes finding the region of the input image that was transformed into the selected region of the output image by the one or more transformations.

Further preferably, substituting the content of the located region includes finding connected components in the located region and copying the connected components to the selected region in the output image. Most preferably, copying the connected components includes finding, for each of the connected components in the located region, a translation operation to be applied to all of the points in the connected component. Preferably, finding the translation operation includes, for each of the connected components, choosing a point on or in a vicinity of the connected component and determining a translation that was applied to that point by the one or more transformations applied to the input image. In a preferred embodiment, finding the connected components includes finding characters in the image.

In a further preferred embodiment, the content of interest includes alphanumeric characters, and the method includes applying optical character recognition to the substituted content in the selected region.

There is also provided, in accordance with a preferred embodiment of the present invention, apparatus for processing an input image of a document including a template having one or more regions that are filled in with content, the apparatus including a form processor, which is adapted to apply one or more transformations to the input image so as to generate an output image in which the template is registered with a reference template, to select at least one of the filled-in regions in the output image, to locate in the input image at least one filled-in region corresponding to the at least one selected region in the output image, and to substitute the content of the at least one located region in the input image for the content of the at least one selected region in the output image.

Preferably, the content filled into the one or more region includes alphanumeric characters, and the processor applies optical character recognition to the substituted content in the at least one selected region so as to extract the content from the document. Further preferably, the apparatus includes an imaging device, which is adapted to scan the document so as to generate the input image.

There is additionally provided, in accordance with a preferred embodiment of the present invention, a computer software product for processing an input image, the product including a computer-readable medium in which program instructions are stored, which instructions, when read by a computer, cause the computer to apply one or more transformations to the input image, whereby different shifts are applied to different pixels in the input image, so as to generate an output image, to select in the output image a region containing content of interest, to locate in the input image the region corresponding to the selected region in the output image, and to substitute the content of the located region in the input image for the content of the selected region in the output image.

In a preferred embodiment, the input image includes a template delineating the region, which is filled in with the content of interest, and the instructions cause the computer to apply the one or more transformations so as to register the output image with a reference template.

The present invention will be more fully understood from the following detailed description of the preferred embodiments thereof, taken together with the drawings in which:

DETAILED DESCRIPTION OF PREFERRED EMBODIMENTS

Figure 4:
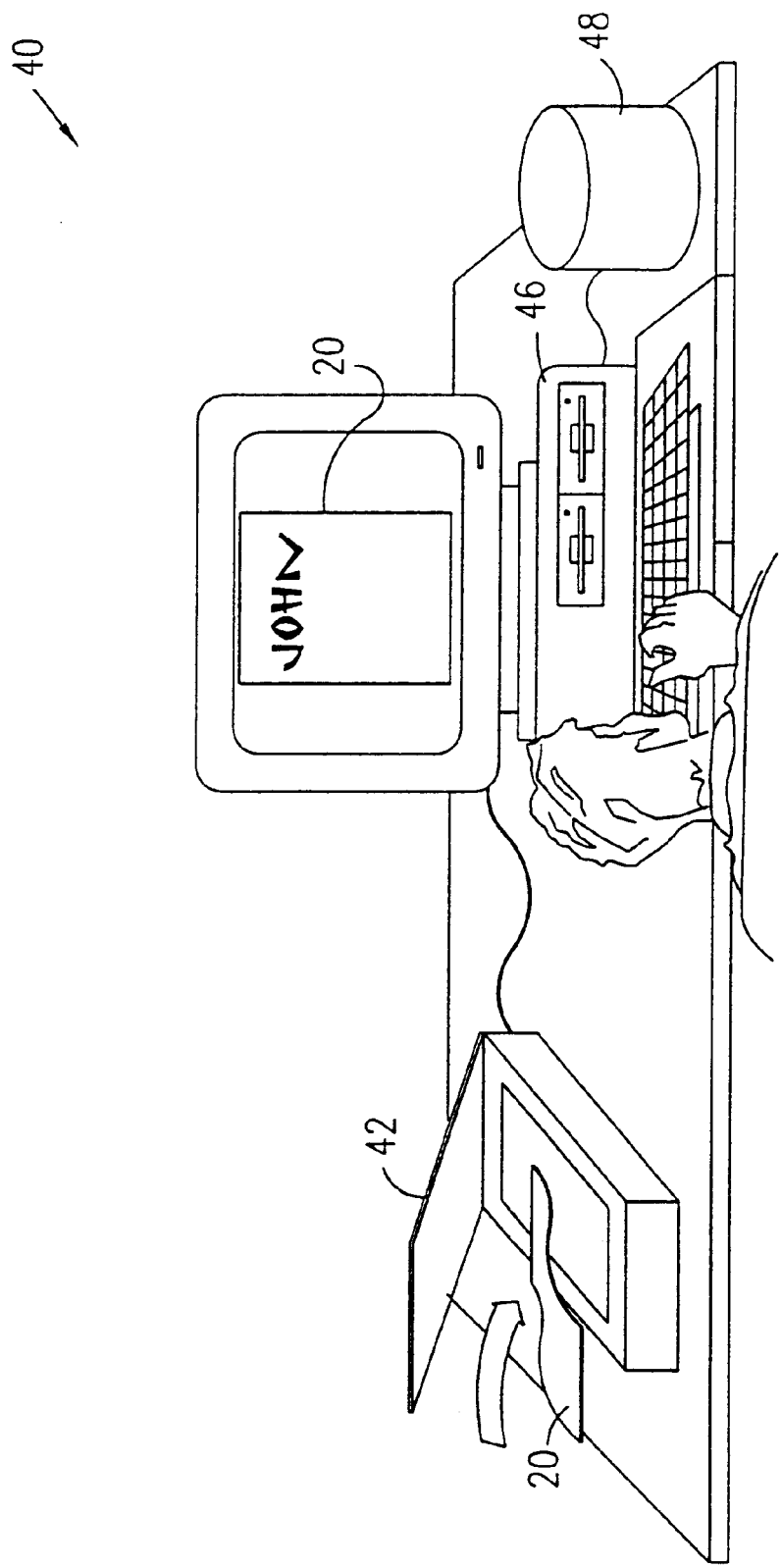
FIG. 4 is a schematic, pictorial illustration of a system for processing document images, in accordance with a preferred embodiment of the present invention.

FIG. 4 is a schematic, pictorial illustration of a system 40 for storage and display of document images, in accordance with a preferred embodiment of the present invention. System 40 comprises a scanner 42, or any suitable type of image capture device known in the art, which receives and scans a document comprising a preprinted form, such as document 20, which is filled in with handwritten, typed or printed characters. The scanner captures an image of the document and conveys the corresponding image data to a form processor 46, typically comprising a suitable general-purpose computer. Alternatively, the image is input to the processor from another source. Processor 46 registers the document image with a reference template image that is stored in a memory 48, such as a magnetic or optical disk. The processor then corrects the image for distortions that may have occurred in the characters due to the registration process, as described hereinbelow. Optionally, the processor then reads the characters, using optical character recognition (OCR) methods known in the art.

The image processing functions of processor 46 are preferably performed using software running on the processor, which implements an embodiment of the present invention, as described in detail hereinbelow. The software may be supplied on tangible media, such as diskettes or CD-ROM, and loaded into the processor. Alternatively, the software may be downloaded to the processor via a network connection or other electronic link. Further alternatively, processor 46 may comprises dedicated, hard-wired elements or a digital signal processor for carrying out some or all of the image processing steps.

Figure 3:
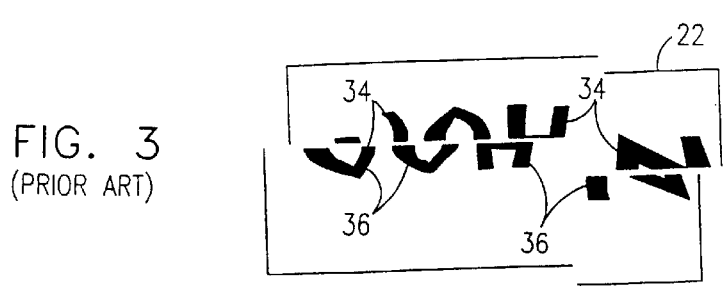
FIG. 3 is a schematic illustration showing the image of FIG. 1 following processing of the image using the method of FIG. 2.
Figure 5:
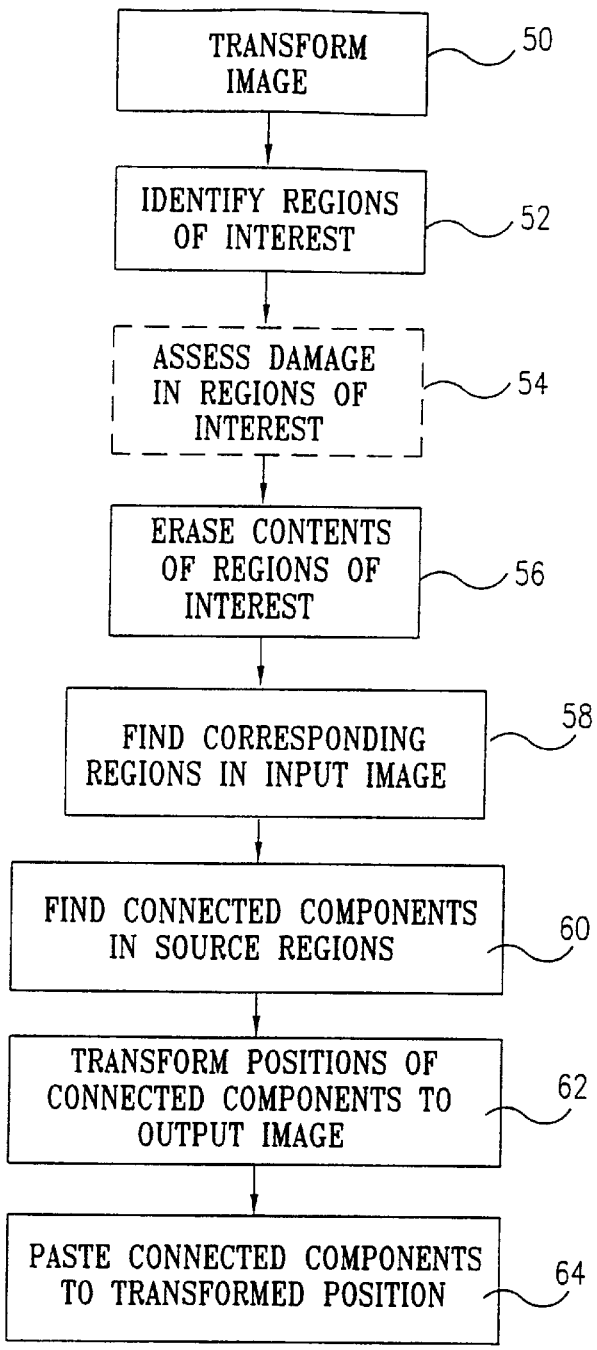
FIG. 5 is a flow chart that schematically illustrates a method for processing images, in accordance with a preferred embodiment of the present invention.

FIG. 5 is a flow chart that schematically illustrates a method for processing images of filled-in form documents, in accordance with a preferred embodiment of the present invention. This method remedies the distortion and break-up of characters in the image due to local shifts and other transformations applied in registering the document image with a reference template. At an image transformation step 50, one or more transformations are applied to an input image so as to bring a template in the image into registration with a stored reference template. The input image preferably comprises a binary image, which is derived from the data scanned in by scanner 42, using any suitable image processing method known in the art. Alternatively, the input image may comprise a gray-scale or color image. Substantially any suitable method may be used to transform the image at step 50, such as those described in the above-mentioned U.S. Pat. Nos. 5,182,656 and 5,793,887. The resultant output image is likely to contain regions in which the readability of the charters is adversely affected, as shown in FIG. 3, for example. Preferably, the transformations that were applied to each segment of the input image are saved for later reference.

Figure 1:
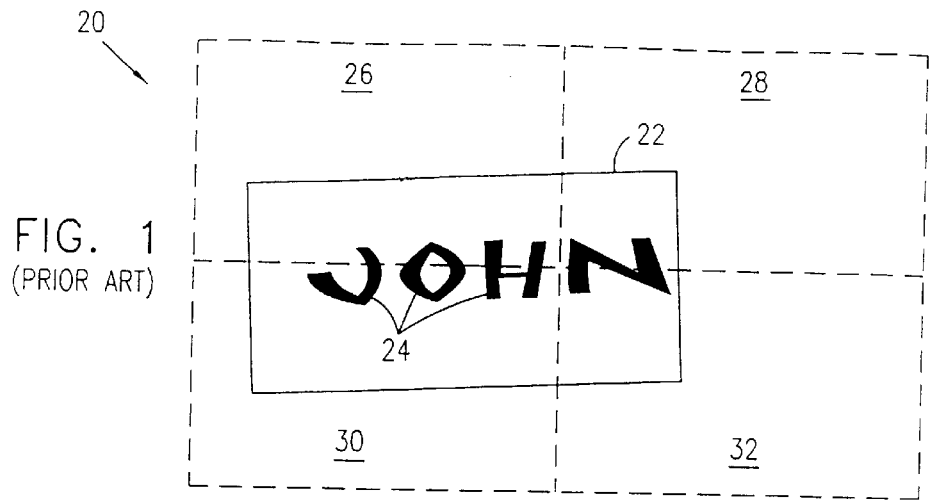
FIG. 1 is a schematic illustration of a detail of an image of a filled-in form document, useful in understanding the present invention.
Figure 2:
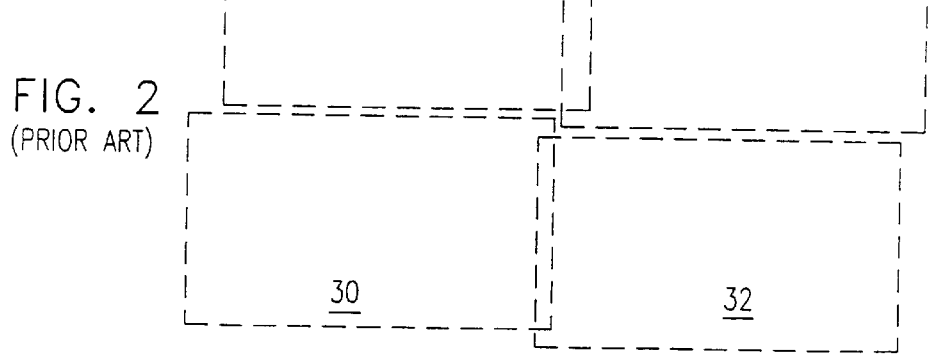
FIG. 2 is a schematic illustration showing relative shifts applied to segments of the image of FIG. 1 in the course of processing the image using a method known in the art.

At a region identification step 52, processor 46 identifies regions of interest in the output image. These are regions of the template that were filled in and may have been adversely affected at transformation step 50. Preferably, the regions are selected from a list of known fields in the template. Alternatively or additionally, the regions are selected by removing the template from the image after registration, as described in the above-mentioned patents, and finding the filled-in areas that remain. Optionally, at a damage assessment step 54, the processor determines in which of the regions of interest the characters may have been distorted at transformation step 50. This will be the case, for example, when two or more parts of a given region, such as the region contained within box 22 (FIGS. 1 and 3), fall into different segments of the image, to which significantly different transformations were applied. These "damaged" regions are selected for subsequent processing, while regions in which all segments were transformed in substantially the same way need not be processed further. At a content erasure step 56, the characters (or other content) in the selected regions of interest are erased from the output image.

In order to replace the erased contents, processor 46 finds, for each of the selected regions of interest, a corresponding source region in the input image, at an input region finding step 58. Preferably, the source region is found by working backwards through the transformations that were applied to reach the selected region in the output image at step 50. At a component finding step 60, processor 46 finds connected components in the source region, as is known in the art. These connected components are contiguous or nearly-contiguous groups of pixels meeting morphological criteria that identify them with high likelihood as belonging to written characters. Characters 24 in FIG. 1 meet such criteria, for example.

Preferably, at step 58, the boundaries of each of the source regions are refined so as to exclude connected components that are only partially contained in the template field corresponding to the source region. To accomplish this refinement, the topmost empty row (i.e., a row containing only white pixels) is found in the region, and the next non-empty row below it is recorded as a top candidate. Similarly, the lowest empty row in the field is found, and the next non-empty row above it is recorded as a bottom candidate. If the top and bottom candidates do not conflict (for example, by overlapping), the region boundaries are redefined to be the top and bottom candidates. A similar procedure is applied to the left and right sides of the region. These steps may result in some shrinkage of the region. The (adjusted) region boundaries may again be expanded in all directions, at step 60, so as to include all of the connected components of all of the pixels left inside the region. If this step results, however, in any side of the region being enlarged by more than a preset threshold (for example, 20%) beyond the original boundaries of the corresponding field, the region is preferably excluded from the remaining steps of the process of FIG. 5. In this manner, artifacts in the output image due to extraneous connected components, which may not belong inside this template field, are avoided.

For each connected component found in the region of interest, processor 46 determines, at a position transformation step 62, an appropriate transformation of position coordinates in order to translate the component to a corresponding position in the selected region of the output image. Preferably, a point on the connected component is chosen, such as its center of gravity or, alternatively, one of its corners. The processor then determines the net translation that was applied to this chosen point in transforming the input image into the output image. At a paste step 64, this same net translation is applied to all of the points in the connected component. In this manner, the connected components are pasted one by one into the appropriate positions in the region of interest in place of the previous contents of the region, which were erased at step 56. Alternatively, step 60 may be skipped, and a single translation transformation may be determined and applied to paste the entire contents of the region of interest from the input image to the output image.

Figure 6:
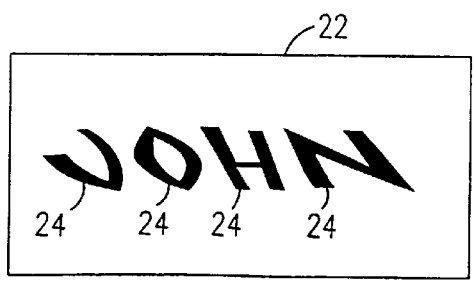
FIG. 6 is a schematic illustration showing the results of processing the document image of FIG. 1 using the method of FIG. 5.

FIG. 6 is a schematic illustration of box 22 and characters 24 therein as seen in an output image generated in accordance with the method of FIG. 5. Broken portions 34 and 36 of the characters have been erased, and instead the original characters have been pasted into the box from the input image of FIG. 1. Because of the rotation of the input image, each of the characters in the output image, shown in FIG. 5, also appears slightly rotated, since the same transformation was applied at step 64 to all points in the character. This rotation is easily overcome, however, by OCR programs known in the art, and the more troublesome break-up of the characters seen in FIG. 3 is avoided.

Although preferred embodiments are described herein with reference to processing of template-based forms, the principles of the present invention may similarly be applied to processing of other types of images, as well. It frequently occurs in various image processing contexts that a digital transformation applied to an image is not exact, in the sense that the resulting offset between two neighboring pixels is different from the theoretical offset. This inexactness may be due to local segment transformations, as described above, or to other errors, such as rounding or decimation. If there is a text block in the image that must be read (irrespective of the presence of a template), the method of the present invention may be used advantageously under these circumstances to enhance its readability. As another example, in an aerial image that is rotated and warped to compensate for imaging conditions, the present invention may be used to preserve the visibility of certain details in that image that are of particular interest and so must be presented with minimal distortion. Further applications such as these will be apparent to those skilled in the art.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for processing an input image, comprising:
    applying one or more transformations to the input image, whereby different shifts are applied to different pixels in the input image, so as to generate an output image;
    selecting in the output image a region containing content of interest;
    locating in the input image the region corresponding to the selected region in the output image; and
    substituting the content of the located region in the input image for the content of the selected region in the output image.

2. A method according to claim 1, wherein applying the one or more transformations comprises dividing the input image into segments, and determining a transformation to be applied to each segment.

3. A method according to claim 2, wherein the input image includes a template delineating the region, which is filled in with the content of interest, and wherein determining the transformation to be applied to each segment comprises finding one or more translations of the segment that approximately compensate for a distortion of the input image relative to a reference template, whereby the output image is registered with the reference template.

4. A method according to claim 3, wherein the one or more translations compensate for a rotation of the input image relative to the reference template.

5. A method according to claim 2, wherein applying the one or more transformations comprises applying different transformations to two or more mutually-adjoining segments.

6. A method according to claim 5, wherein selecting the region comprises selecting a region that was divided between the two or more segments to which different transformations were applied.

7. A method according to claim 1, wherein the input image includes a template delineating the region, which is filled in with the content of interest, and wherein selecting the region comprises identifying a field of the template that is intended to receive the content of interest.

8. A method according to claim 1, wherein the input image includes a template delineating the region, which is filled in with the content of interest, and wherein selecting the region comprises removing the template from the output image and selecting a portion of the image remaining after the template is removed.

9. A method according to claim 1, wherein selecting the region comprises selecting a region responsive to the one or more transformations applied to the input image.

10. A method according to claim 9, wherein the content of interest comprises alphanumeric characters, and wherein selecting the region comprises selecting a region in which it is likely that the one or more transformations have adversely affected the readability of the characters in the region.

11. A method according to claim 1, wherein locating the region comprises finding the region of the input image that was transformed into the selected region of the output image by the one or more transformations.

12. A method according to claim 1, wherein substituting the content of the located region comprises finding connected components in the located region and copying the connected components to the selected region in the output image.

13. A method according to claim 12, wherein copying the connected components comprises finding, for each of the connected components in the located region, a translation operation to be applied to all of the points in the connected component.

14. A method according to claim 13, wherein finding the translation operation comprises, for each of the connected components, choosing a point on or in a vicinity of the connected component and determining a translation that was applied to that point by the one or more transformations applied to the input image.

15. A method according to claim 12, wherein finding the connected components comprises finding characters in the image.

16. A method according to claim 1, wherein the content of interest comprises alphanumeric characters, and wherein the method comprises applying optical character recognition to the substituted content in the selected region.

17. Apparatus for processing an input image of a document including a template having one or more regions that are filled in with content, the apparatus comprising a form processor, which is adapted to apply one or more transformations to the input image so as to generate an output image in which the template is registered with a reference template, to select at least one of the filled-in regions in the output image, to locate in the input image at least one filled-in region corresponding to the at least one selected region in the output image, and to substitute the content of the at least one located region in the input image for the content of the at least one selected region in the output image.

18. Apparatus according to claim 17, wherein the content filled into the one or more region comprises alphanumeric characters, and wherein the processor applies optical character recognition to the substituted content in the at least one selected region so as to extract the content from the document.

19. Apparatus according to claim 18, and comprising an imaging device, which is adapted to scan the document so as to generate the input image.

20. A computer software product for processing an input image, the product comprising a computer-readable medium in which program instructions are stored, which instructions, when read by a computer, cause the computer to apply one or more transformations to the input image, whereby different shifts are applied to different pixels in the input image, so as to generate an output image, to select in the output image a region containing content of interest, to locate in the input image the region corresponding to the selected region in the output image, and to substitute the content of the located region in the input image for the content of the selected region in the output image.

21. A product according to claim 20, wherein the instructions cause the computer to divide the input image into segments, and to determine a transformation to be applied to each segment.

22. A product according to claim 20, wherein the content of interest comprises alphanumeric characters, and wherein the instructions cause the computer to select a region for substitution of the content thereof when it is likely that the one or more transformations have adversely affected the readability of the characters in the selected region.

23. A product according to claim 20, wherein the instructions cause the computer to find connected components in the located region and to copy the connected components to the at least one selected region in the output image.

24. A product according to claim 23, wherein the instructions cause the computer to find, for each of the connected components in the located region, a translation operation to be applied to all of the points in the connected component.

25. A product according to claim 20, wherein the content of interest comprises alphanumeric characters, and wherein the instructions further cause the computer to apply optical character recognition to the substituted content in the selected region.

26. A product according to claim 20, wherein the input image includes a template delineating the region, which is filled in with the content of interest, and wherein the instructions cause the computer to apply the one or more transformations so as to register the output image with a reference template.

* * * * *